(12) United States Patent
Komatsu

(10) Patent No.: US 12,725,029 B2
(45) Date of Patent: Sep. 1, 2026

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Takayuki Komatsu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1295 days.

(21) Appl. No.: 17/189,571

(22) Filed: Mar. 2, 2021

(65) Prior Publication Data

US 2021/0279575 A1 Sep. 9, 2021

(30) Foreign Application Priority Data

Mar. 5, 2020 (JP) ................................ 2020-038120

(51) Int. Cl.
*G06N 3/08* (2023.01)
*G06F 18/20* (2023.01)
*G06F 18/21* (2023.01)

(52) U.S. Cl.
CPC ............ *G06N 3/08* (2013.01); *G06F 18/217* (2023.01); *G06F 18/285* (2023.01)

(58) Field of Classification Search
CPC ... G06N 3/08; G06N 3/04; G06N 5/01; G06F 18/217; G06F 18/285
See application file for complete search history.

(56) References Cited

U.S. PATENT DOCUMENTS 10,824,940 B1 * 11/2020 Rybakov .................. G06N 7/01
11,170,289 B1 * 11/2021 Duong ................... G06N 20/00
11,222,257 B1 * 1/2022 Ko ......................... G06N 3/045
11,410,016 B2 * 8/2022 Xu ........................... G06N 3/04
11,797,875 B1 * 10/2023 Gao ................... G06Q 30/0242
11,983,633 B2 * 5/2024 Okajima ............. G06N 3/0464
12,393,835 B2 * 8/2025 Li .......................... G06N 3/045
2015/0242484 A1 * 8/2015 Zhao ....................... G06F 16/22 707/755
2018/0268298 A1 * 9/2018 Johansen ............... G06V 10/82
2019/0057305 A1 * 2/2019 Denolf ...................... G06N 3/09
2019/0057309 A1 * 2/2019 Oobuchi ................ G06N 3/063
2019/0138882 A1 * 5/2019 Choi ...................... G06N 3/048
2019/0378009 A1 * 12/2019 Nuzman ................. G06N 3/08
2020/0134475 A1 * 4/2020 Hill ......................... H03M 7/24
(Continued)

FOREIGN PATENT DOCUMENTS

JP 2005-122465 A 5/2005

*Primary Examiner* — Mariela Reyes
*Assistant Examiner* — Evel Honore
(74) *Attorney, Agent, or Firm* — Cowan, Liebowitz & Latman, P.C.

(57) ABSTRACT

An information processing apparatus designates one or more constraints for constraining a configuration of a neural network, which include information for specifying the configuration of the neural network and the maximum number of computations in the neural network, and executes a computation of a neural network configured based on the designated constraints. When a neural network is trained, the information processing apparatus trains respective neural networks under the one or more designated constraints, and selects, for estimation, a predetermined learned model out of the learned models trained under the one or more designated constraints.

13 Claims, 5 Drawing Sheets

(56) References Cited

U.S. PATENT DOCUMENTS

| | | | | |
|---|---|---|---|---|
| 2020/0205745 | A1* | 7/2020 | Khosousi | G06F 18/217 |
| 2020/0257966 | A1* | 8/2020 | Dumoulin | G06N 3/0495 |
| 2020/0259964 | A1* | 8/2020 | Mizuta | G06N 3/084 |
| 2020/0272890 | A1* | 8/2020 | Matsumoto | G06F 7/523 |
| 2020/0364545 | A1* | 11/2020 | Shattil | G06N 3/08 |
| 2020/0387781 | A1* | 12/2020 | Hiroi | G06N 3/00 |
| 2021/0224605 | A1* | 7/2021 | Zhang | G06N 20/00 |
| 2021/0312295 | A1* | 10/2021 | Takahashi | G06N 3/086 |
| 2022/0044020 | A1* | 2/2022 | Sasao | G06V 10/774 |
| 2022/0076125 | A1* | 3/2022 | Mizukoshi | G06N 3/0499 |

* cited by examiner

FIG. 1

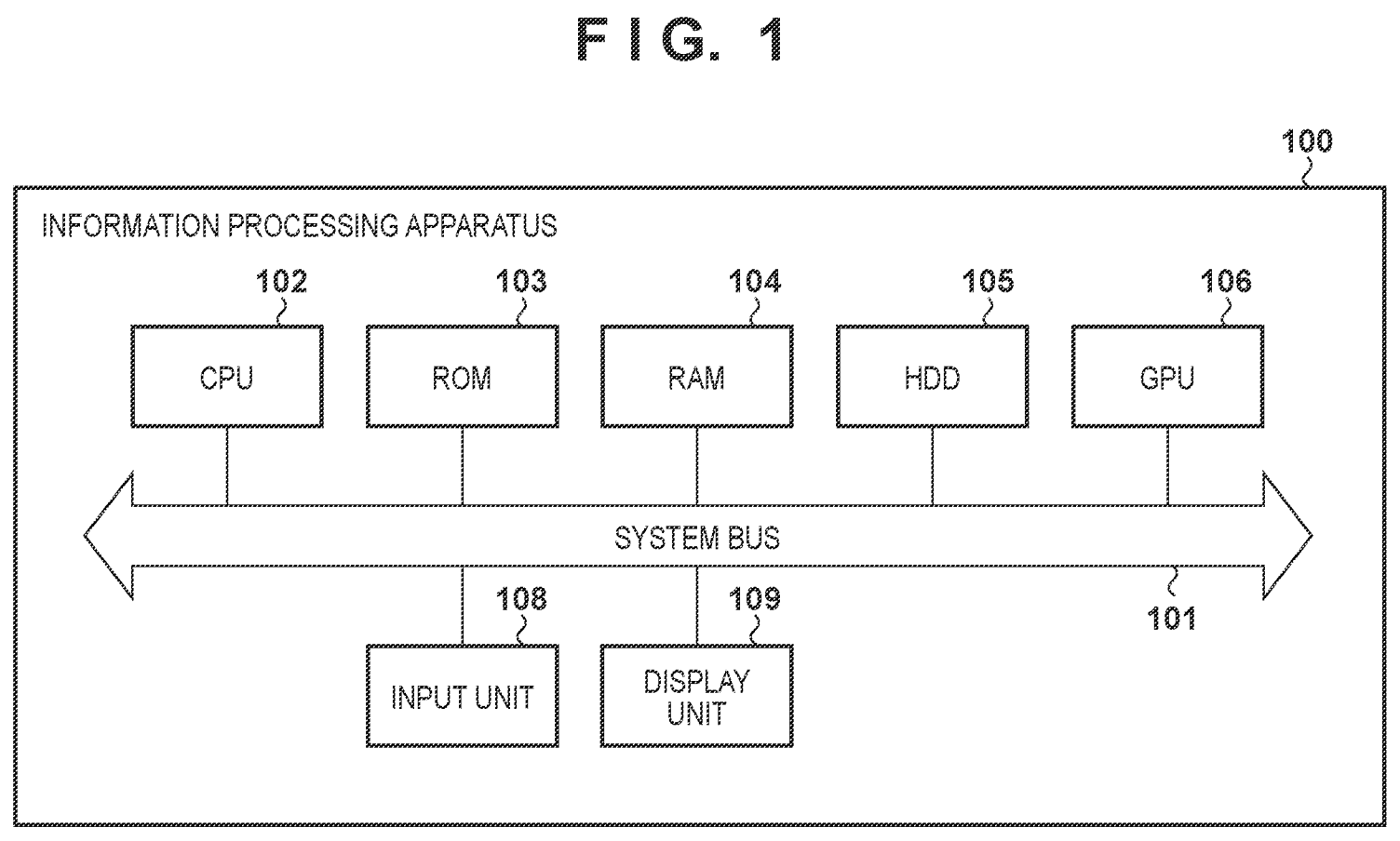

100
INFORMATION PROCESSING APPARATUS
102 CPU
103 ROM
104 RAM
105 HDD
106 GPU
101 SYSTEM BUS
108 INPUT UNIT
109 DISPLAY UNIT

FIRST LAYER COMPUTATION
201
202
203
204
205
1
X1
X2
X3
X4
×b1
×b2
×b3
×W11
×W21
×W31
×W12
×W22
×W32
×W13
×W23
×W33
×W14
×W24
×W34
210
211
212
Y1
Y2
Y3
h()
Z1
Z2
Z3
SECOND LAYER COMPUTATION
FULLY-CONNECTED COMPUTATION
ACTIVATION FUNCTION COMPUTATION

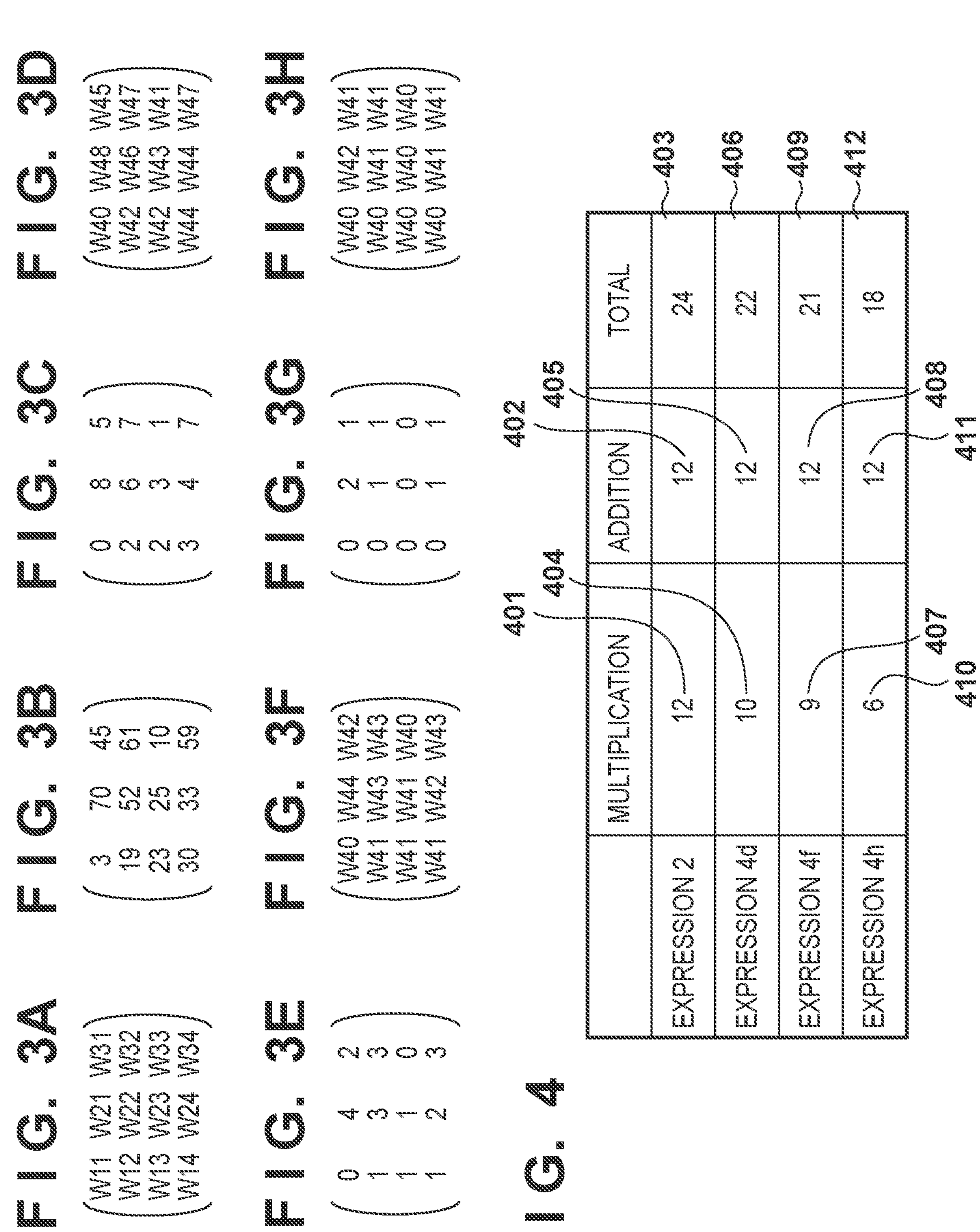
| | MULTIPLICATION | ADDITION | TOTAL |
|---|---|---|---|
| EXPRESSION 2 | 12 | 12 | 24 |
| EXPRESSION 4d | 10 | 12 | 22 |
| EXPRESSION 4f | 9 | 12 | 21 |
| EXPRESSION 4h | 6 | 12 | 18 |

INFORMATION PROCESSING APPARATUS, INFORMATION PROCESSING METHOD, AND STORAGE MEDIUM

BACKGROUND OF THE INVENTION

Field of the Invention

The present invention relates to an information processing apparatus, an information processing method, and a storage medium.

Description of the Related Art

Conventionally, a technique for optimizing a matrix computation in computations in machine learning in order to efficiently perform the computations in the machine learning is known (Japanese Patent Laid-Open No. 2005-122465). Japanese Patent Laid-Open No. 2005-122465 discloses, regarding product-sum computations of a neural network, a technique for shortening a computation time as a result of, when performing product-sum computations of a plurality of input values by weight coefficients, assigning the same labels to the same input values and inputting the input values in parallel to a plurality of multipliers to perform multiplication.

In the above-described conventional technology, in a case where the number of same values that exceeds the number of product-sum computing elements provided in an estimating element are input, all of the product-sum computations cannot be performed in parallel at once, and thus there are cases where it is difficult to assess a time required for the computations. For example, in apparatuses in which there is demand for real-time processing such as digital cameras, there are cases where an estimating element is desired to complete processing in real time. A technique that can complete computations within a predetermined time is desired for an estimating element that is used in such apparatuses, in addition to an increase in the speed of computations by optimizing a matrix computation.

SUMMARY OF THE INVENTION

The present disclosure has been made in consideration of the aforementioned issues, and realizes a technique that can provide an estimating element trained so as to complete computations for a neural network within a predetermined time.

In order to solve the aforementioned problems, one aspect of the present disclosure provides an information processing apparatus comprising: one or more processors; and a memory storing instructions which, when the instructions are executed by the one or more processors, cause the information processing apparatus to function as: a designation unit configured to designate one or more constraints for constraining a configuration of a neural network, the constraints including information for specifying the configuration of the neural network and the maximum number of computations in the neural network; and a processing unit configured to execute a computation of a neural network configured based on the designated constraints, wherein, when a neural network is trained, the processing unit trains respective neural networks under the one or more designated constraints, and selects, for estimation, a predetermined learned model out of the learned models trained under the one or more designated constraints.

Another aspect of the present disclosure provides, an information processing method comprising: designating one or more constraints for constraining a configuration of a neural network, the constraints including information for specifying the configuration of the neural network and the maximum number of computations in the neural network; and processing for executing a computation of a neural network configured based on the one or more designated constraints, wherein, the processing comprises, when a neural network is trained, training respective neural networks under the one or more designated constraints, and selecting, for estimation, a predetermined learned model out of the learned models trained under the one or more designated constraints.

Still another aspect of the present disclosure provides, a non-transitory computer-readable storage medium comprising instructions for performing an information processing method, the information processing method comprising: designating one or more constraints for constraining a configuration of a neural network, the constraints including information for specifying the configuration of the neural network and the maximum number of computations in the neural network; and processing for executing a computation of a neural network configured based on the one or more designated constraints, wherein, processing comprises, when a neural network is trained, training respective neural networks under the one or more designated constraints, and selecting, for estimation, a predetermined learned model out of the learned models trained under the one or more designated constraints.

According to the present invention, it is possible to provide an estimating element trained so as to complete computations for a neural network within a predetermined time.

Further features of the present invention will become apparent from the following description of exemplary embodiments (with reference to the attached drawings).

BRIEF DESCRIPTION OF THE DRAWINGS

FIG. 1 is a block diagram showing an exemplary function configuration of a personal computer (PC) that is an example of an information processing apparatus according to an embodiment of the present invention.

FIGS. 3A to 3H are diagrams for illustrating quantization of weight coefficients according to an embodiment of the present invention.

FIG. 4 is a diagram showing an example of effects before and after quantization of weight coefficients according to an embodiment of the present invention.

DESCRIPTION OF THE EMBODIMENTS

First Embodiment

Figure 2:
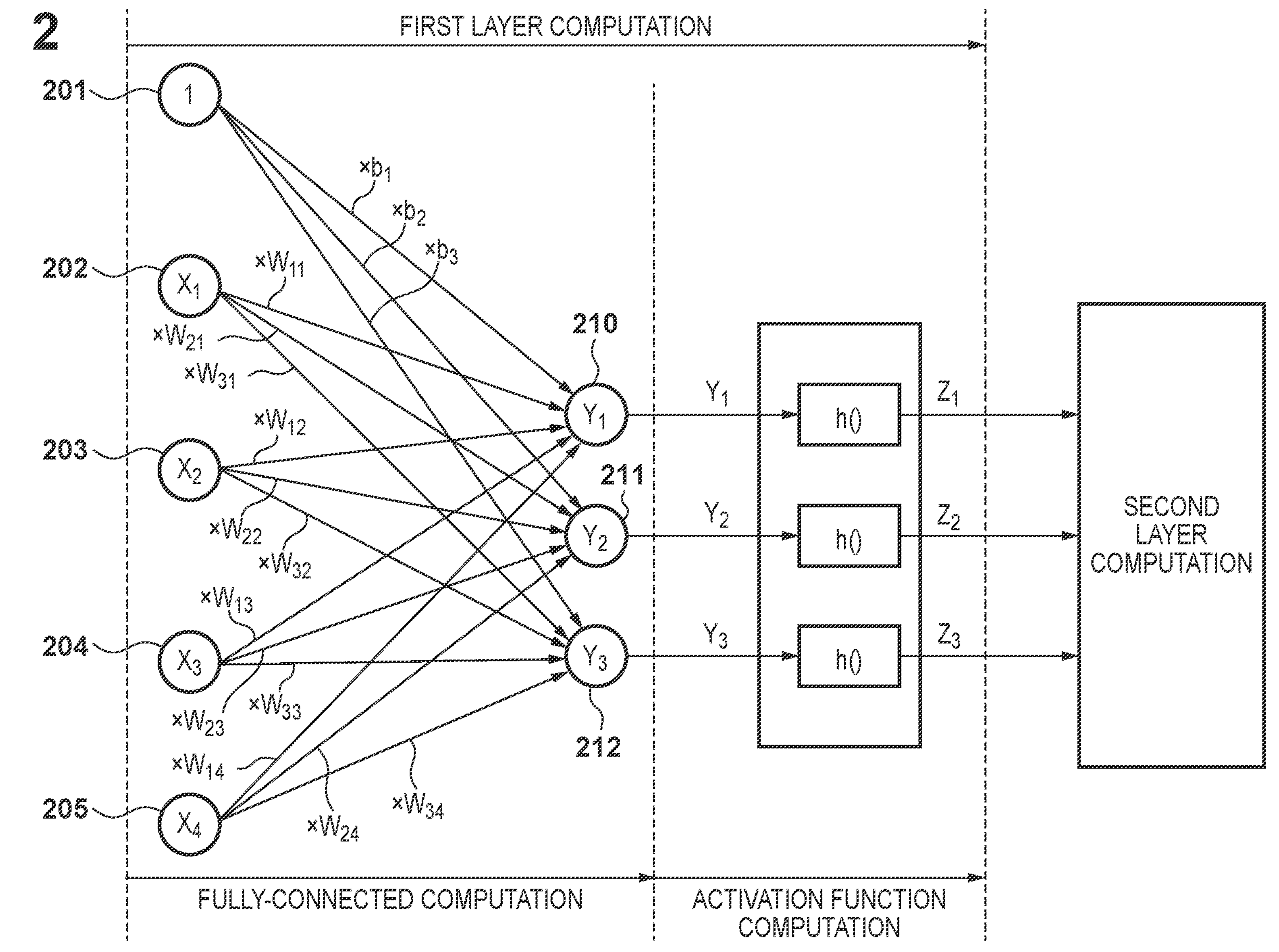
FIG. 2 is a diagram schematically showing computation processing in one of a plurality of layers of a neural network.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

An example will be described below in which a personal computer (PC) that can perform learning using a neural network is used, as an example of an information processing apparatus. Note that the embodiment to be described below is applicable to not only a PC, but also other devices that can perform learning using a neural network. These devices may include mobile phones that include smartphones, game machines, tablet terminals, watch-type and eye-glass-type information terminals, medical devices, devices in monitoring systems and in-vehicle systems, and server devices that operate in data centers, for example.

The PC according to the embodiment below performs learning and estimation processing through machine learning using an estimating element constituted by a neural network. According to this embodiment, the neural network that constitutes the estimating element is configured as a result of the neural network being constrained under a predetermined condition and being trained, computation of a configured matrix is performed through estimation processing, and thus it is made possible to shorten the computation time and complete computations of the estimating element within a predetermined time.

Configuration of PC

FIG. 1 is a block diagram showing an exemplary function configuration of the PC that is an example of the information processing apparatus according to this embodiment. Note that one or more out of the function blocks shown in FIG. 1 may be realized by hardware such as an ASIC or a programmable logic array (PLA), or may also be realized as a result of a programmable processor such as a CPU or GPU executing software. In addition, one or more function blocks may also be realized as a combination of software and hardware. Therefore, even in a case where different function blocks perform operations according to the following description, the same hardware may be realized as performing the operations.

A system bus 101 is a data bus for transmitting/receiving information between the blocks within a PC 100. A CPU 102 is a central computation processing apparatus that performs control of the blocks of the PC 100 and control of input/output from/to the outside. The CPU 102 controls overall operations of the PC 100 and operations of constituent elements of the PC 100 by deploying a computer program stored in a ROM 103 to a RAM 104, and executing the computer program.

The ROM 103 is a read-only memory, and is constituted by a non-volatile semiconductor memory such as an EEPROM, and stores a computer program for the CPU 102 to control the PC 100, for example. The RAM 104 is a random access memory, and is a volatile semiconductor memory such as a DRAM. The RAM 104 is used by not only the CPU 102 but also the blocks in the PC 100, as a space for temporarily storing information as necessary. Examples of such information include information related to execution of a program, information regarding a result of executing a program, and information regarding input/output of various computations for machine learning, for example.

An HDD 105 is a Hard Disk Drive. The HDD 105 is used by the blocks in the PC 100 as a space for storing information for a long time as necessary. Examples of information that is stored in the HDD 105 include a learning model in machine learning and a learned model. According to this embodiment, an HDD will be described as an example, but a drive that uses a semiconductor memory such as an SSD may also be used as long as it can be used as a storage. In addition, the HDD 105 may also be used as alternative of the RAM 104.

A GPU 106 is a graphics processing unit, and, for example, is used for computations during learning or estimation of machine learning. The GPU 106 can perform efficient computations by processing a larger amount of information in parallel. Thus, the GPU 106 is effective in a case where a computation is repeatedly performed a plurality of times using a learning model such as those for machine learning. In this embodiment, in addition to the CPU 102, the GPU 106 is used for performing computations for machine learning. For example, in a case where a program that includes a learning model is executed, the CPU 102 and the GPU 106 perform a computation in cooperation, thereby executing learning and estimation processing.

An input unit 108 includes a keyboard and mouse used in the personal computer, for example, and accepts an operating instruction from the user that uses the PC 100. A display unit 109 controls screen display of a monitor or a display apparatus that is equivalent to a monitor, for example. The display unit 109 may include a display apparatus itself such as a monitor. The screen display includes display of an operation state in response to an operating instruction from the user that uses the PC 100, menu display for operating the PC 100, display of various applications, and the like.

Computation Processing for Neural Network

Next, computation processing of a neural network that is used for machine learning will be described with reference to FIG. 2. FIG. 2 schematically shows computation processing in one of a plurality of layers of a neural network that constitutes one estimating element according to this embodiment. Note that the neural network has a configuration in which a hidden layer (may be called "intermediate layer") is formed by using one or more layers out of the layers shown in FIG. 2, with an input layer provided at a stage before the hidden layer and an output layer provided at a stage behind hidden layer, for example. The input layer forms a layer to which information that is input to the neural network is input, and the output layer forms a layer from which an output value of the neural network (for example, an output value indicating an estimation result) is output.

Nodes 201 to 205 represent nodes of the neural network. The nodes 202 to 205 represent nodes for input (or nodes constituting a former-stage layer), and the node identified as "1" (the node 201) represents a node for indicating a bias value for an input value. The coefficients added to the lines extending from the nodes for input to nodes 210 to 212 respectively indicate weight coefficients by which signals input to the nodes for input are multiplied. Specifically, input values $X_1$ to $X_4$ input from the nodes for input are multiplied by coefficients, namely weight coefficient, and are input to the nodes 210 to 212. This computation is expressed as a matrix computation such as Expression 1.

$$(X_1 \quad X_2 \quad X_3 \quad X_4)\begin{pmatrix} w_{11} & w_{21} & w_{31} \\ w_{12} & w_{22} & w_{32} \\ w_{13} & w_{23} & w_{33} \\ w_{14} & w_{24} & w_{34} \end{pmatrix} + \begin{pmatrix} b_1 \\ b_2 \\ b_3 \end{pmatrix} \rightarrow (Y_1 \quad Y_2 \quad Y_3) \tag{1}$$

Expression 2 specifically expresses the calculation for deriving $Y_1$ to $Y_3$ shown in Expression 1.

$$\left.\begin{aligned} Y_1 &= X_1 \times w_{11} + X_2 \times w_{12} + X_3 \times w_{13} + X_4 \times w_{14} + b_1 \\ Y_2 &= X_1 \times w_{21} + X_2 \times w_{22} + X_3 \times w_{23} + X_4 \times w_{24} + b_2 \\ Y_3 &= X_1 \times w_{31} + X_2 \times w_{32} + X_3 \times w_{33} + X_4 \times w_{34} + b_3 \end{aligned}\right\} \quad (2)$$

Here, the computation for obtaining $Y_1$ to $Y_3$ from $X_1$ to $X_4$ is referred to as "neuron computation", and the result of the neuron computation of $Y_1$ to $Y_3$ is input to an activation function h( ) for performing 1 input-1 output calculation. A ReLU function or the like may be used as an example of such an activation function. Outputs $Z_1$ to $Z_3$ of the activation function correspond to outputs of one layer of the neural network for the input values $X_1$ to $X_4$. In a case where the neural network includes a plurality of intermediate layers between the input layer and the output layer, the outputs $Z_1$ to $Z_3$ are input to the second layer. Note that Expression 3 expresses the conversion from $Y_1$ to $Y_3$ to $Z_1$ to $Z_3$.

$$\left.\begin{aligned} Z_1 &= h(Y_1) \\ Z_2 &= h(Y_2) \\ Z_3 &= h(Y_3) \end{aligned}\right\} \quad (3)$$

Note that, in this embodiment, a case has been described, as an example, in which the number of input nodes is four and the number of output nodes is three, as the structure of the neural network. However, another number of nodes can be used for the neural network.

Series of Operations for Processing During Learning of Learning Model

Next, processing during training of a learning model according to this embodiment will be described with a focus on processing of the matrix computation shown in Expression 2 from among neuron computations, with reference to FIGS. 3A to 3H, 4, and 5. Note that, FIGS. 3A to 3H show specific examples for illustrating quantization of weight coefficients according to this embodiment, and FIG. 4 shows constraints according to this embodiment.

Figure 5:
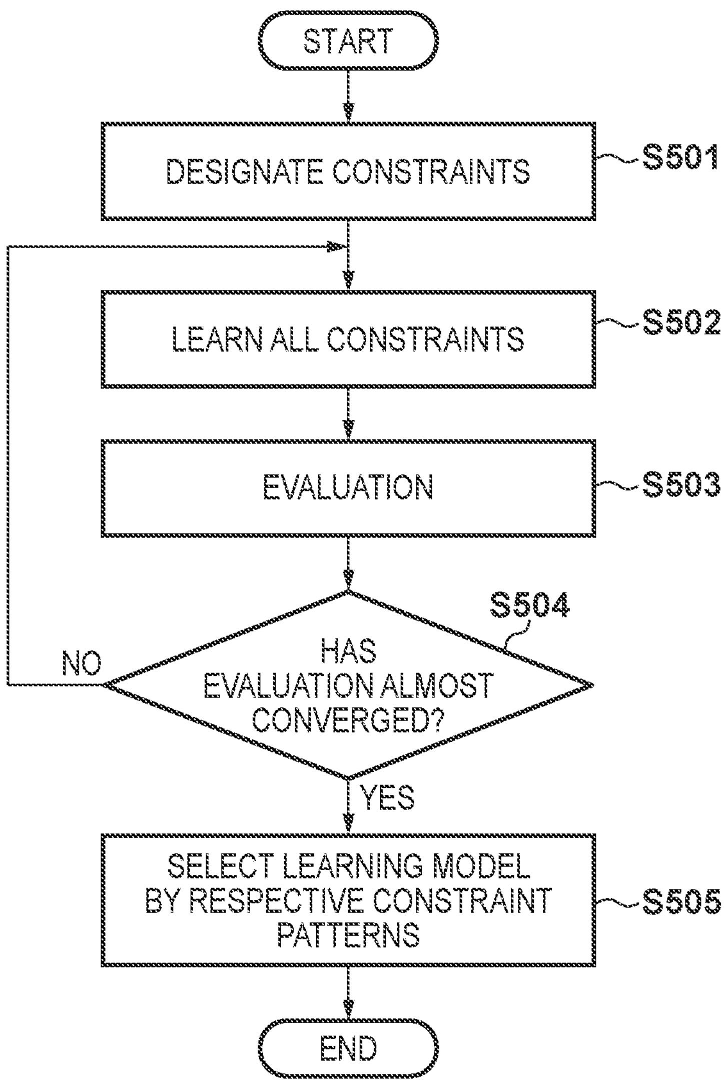
FIG. 5 is a flowchart showing a series of operations during training according to a first embodiment.

FIG. 5 shows a series of operations for processing during training of a learning model using the method of the matrix computation according to this embodiment. Note that this processing is realized as a result of the CPU 102 deploying a program stored in the ROM 103 to a working area of the RAM 104 and executing the program so as to operate the PC 100.

In step S501, the CPU 102 designates one or more constraints for performing training. Examples of the constraints include information for specifying the configuration of the neural network (specifically, the number of nodes of the input layer, the number of nodes of the output layer, the number of layers, and the number of elements of each hidden layer (the number of nodes for each layer)), the maximum number of computations, and an evaluation value.

The maximum number of times of computation refers to the number of times of computation that can be performed by an estimating element (in other words, the neural network). For example, in a case where it is desired that an estimation result be obtained in one second after the estimating element provided with a computing element that can perform a computation at a time in one cycle is driven at 1 MHz, it suffices for an estimation result to be obtained by performing a computation not more than 1,000,000 times. In this case, the maximum number of times of computation is constrained to 1,000,000. Note that the maximum number of times of computation may be expressed as not only the number of times, but also the drive frequency of the estimating element and information regarding a period of time during which the estimating element can be driven. In addition, the evaluation value may be a correct-answer ratio, precision, recall, or F-score, or a numerical value for the evaluation method that is based on these, the numerical value being selected according to an evaluation target or purpose.

A plurality of groups each including the number of nodes of the input layer, the number of nodes of the output layer, the total number of layers (or the number of hidden layers), the number of nodes of each hidden layer, the maximum number of times of computation, and an evaluation value, which have been determined through experiments or the like, may be prepared in advance as the constraints, for example. Alternatively, some groups out of the plurality of prepared groups may be selected in accordance with an evaluation target or a purpose. In addition, a configuration may also be adopted in which the user of the PC 100 can designate constraints via the input unit 108. In this manner, according to this embodiment, as a result of using constraints that include the maximum number of times of computation, the estimating element can end computations within the maximum number of times of computations, and processing at the time of learning or estimation can be executed in a predetermined time.

In step S502, the CPU 102 performs learning under all of the constraints designated in step S501. The CPU 102 proceeds learning by repeatedly performing a computation in accordance with a predetermined number of epochs, for example, and then outputs a learned model and an evaluation value of the learned model for each constraint as a learning result. The learned model is trained under specific constraints, and indicates a state where weight coefficients are updated and optimized, for example. In addition, the evaluation value of the learned model is, for example, a value that is based on the difference value between an output value that is output when an input value is input to the learned model and a correct-answer value for the input value (for example, the square sum of the difference value). Note that, as a result of the GPU 106 performing the computation that is performed in learning, it is possible to shorten the learning time. In addition, the time may be further shortened as a result of a plurality of GPUs 106 performing learning of plurality of conditions in parallel at the same time.

Using, as an example, the number of times of computation, which is one of the constraints, a method for reducing the number of times of computation that is performed by the estimating element will be described below in detail with reference to FIGS. 3A to 3H. FIG. 3A shows a matrix constituted by $W_{11}$, $W_{12}$, $W_{13}$, $W_{14}$, $W_{21}$, $W_{22}$, $W_{23}$, $W_{24}$, $W_{31}$, $W_{32}$, $W_{33}$, and $W_{34}$ that are the weight coefficients of Expression 1. Reference signs indicating the elements of the matrix are the same as Expression 1. FIG. 3B shows a matrix in which specific numerical values replace the weight coefficients in FIG. 3A. The numerical values in FIG. 3B are numerical values for illustrating the first embodiment, but there is no limitation thereto, and the numerical values may be real numbers. FIGS. 3C, 3E, and 3G show examples of values obtained by quantizing the numerical values in FIG. 3B by rounding them. As a result of quantizing the numerical values of a matrix that are weight coefficients, the number of numerical values (weight coefficients) that match another numerical value (weight coefficient) increases, and it is made easy to efficiently perform addition and multiplication such as those to be described later. Specifically, FIG. 3C shows values obtained by leaving higher-order 4 bits of the coefficients shown in FIG. 3B and shifting the higher-order 4 bits by 3 to the right. FIG. 3E shows values obtained by leaving higher-order 3 bits of the coefficients shown in FIG. 3B and shifting the higher-order 3 bits by 4 to the right. In addition, in the example shown in FIG. 3G, higher-order 2 bits of the coefficients shown in FIG. 3B are left and shifted by 5 to the right. In FIGS. 3D, 3F, and 3H, the same numerical values (weight coefficients) in FIGS. 3C, 3E, and 3G are indicated by the same reference signs. In this example, the numerical value of 0 is replaced with $W_{40}$, the numerical value of 1 is replaced with $W_{41}$, the numerical value of 2 is replaced with $W_{42}$, the numerical value of 3 is replaced with $W_{43}$, the numerical value of 4 is replaced with $W_{44}$, the numerical value of 5 is replaced with Was, the numerical value of 6 is replaced with $W_{46}$, the numerical value of 7 is replaced with $W_{47}$, and the numerical value of 8 is replaced with Was. The reference signs in FIG. 3D correspond to the coefficients shown in FIG. 3C, the reference signs in FIG. 3F correspond to the coefficients shown in FIG. 3E, and the reference signs in FIG. 3H correspond to the coefficients shown in FIG. 3G.

$$\left.\begin{aligned} Y_1 &= X_1 \times W_{40} + (X_2 \times X_3) \times W_{42} + X_4 \times W_{43} + b_1 \\ Y_2 &= X_3 \times W_{43} + X_4 \times W_{44} \times X_2 \times W_{46} + X_1 \times W_{48} + b_2 \\ Y_3 &= X_3 \times W_{41} + X_1 \times W_{45} \times (X_2 + X_4) \times W_{47} + b_3 \end{aligned}\right\}$$

(4d)

$$\left.\begin{aligned} Y_1 &= X_1 \times W_{40} + (X_2 \times X_3 \times X_4) \times W_{41} + b_1 \\ Y_2 &= X_3 \times W_{41} + X_4 \times W_{42} \times X_2 + W_{43} \times X_1 \times W_{44} + b_2 \\ Y_3 &= X_3 \times W_{40} + X_1 \times W_{42} \times (X_2 + X_4) \times W_{43} \end{aligned}\right\}$$

(4f)

$$\left.\begin{aligned} Y_1 &= (X_1 + X_2 + X_3 + X_4) \times W_{40} + b_1 \\ Y_2 &= X_3 \times W_{40} + (X_2 \times X_4) \times W_{41} + X_1 \times W_{24} + b_2 \\ Y_3 &= X_3 \times W_{40} + (X_1 + X_2 + X_4) \times W_{41} + b_3 \end{aligned}\right\}$$

(4h)

Expressions 4d, 4f, and 4 h represent equations in which matrix computations are integrated in accordance with a predetermined rule in order to reduce the number of times of computation in a case where the specific examples in FIGS. 3D, 3F, and 3H are applied to Expression 2. The predetermined rule is a rule according to which inputs to which the same weight coefficient is to be applied are added to each other and multiplied by the weight coefficient in advance, and total sum of multiplication results for respective weight coefficients is then obtained.

To describe an example of Expression 4d, in the computation for $Y_1$, $W_{40}$ is first multiplied by the corresponding input $X_1$. Next, $W_{42}$ is multiplied by a value obtained in advance by adding the corresponding inputs $X_2$ and $X_3$. Furthermore, $W_{43}$ is multiplied by the corresponding input $X_4$. Lastly, the total sum of the multiplication result of $W_{40}$, the multiplication result of $W_{42}$, the multiplication result of $W_{43}$, and a bias value bi is obtained. Due to this method, it is possible to omit one multiplication process from the computation of $Y_1$. Similarly, regarding $Y_2$ and $Y_3$ as well, a value obtained by adding, in advance, inputs to be multiplied by the same weight coefficient is multiplied by the corresponding weight coefficient, and the total sum of all of the multiplication results is obtained. In this computation method, a computation equation represented as Expression 4d is obtained. Expressions 4f and 4 h represent equations for performing a computation in accordance with a similar rule.

FIG. 4 shows the number of times of computation in a case where computations are executed in accordance with Expressions 2, 4d, 4f, and 4h. In Expression 2, multiplication is performed 12 times (401), addition is performed 12 times (402), and thus 24 computations are performed in total (403). In Expression 4d, multiplication is performed 10 times (404), addition is performed 12 times (405), and thus 22 computations are performed in total (406). In other words, in Expression 4d, it is indicated that two computations can be deleted from Expression 2. Similarly, in Expression 4f, multiplication is performed 9 times (407), addition is performed 12 times (408), and thus 21 computations are performed in total (409), making it possible to delete three computations. In addition, in Expression 4h, multiplication is performed six times (410), addition is performed 12 times (411), and thus 18 computations are performed in total (412), making it possible to delete six computation.

In step S503, the CPU 102 evaluates the learned models based on the learning results in step S502. Such evaluation can be made based on the evaluation value output in step S502 (in other words, an evaluation value for evaluating the degree of optimization of the learning model), using a known method that is based on a learning curve or a validation curve. Alternatively, the accuracy of the learned model or the like may also be used.

In step S504, the CPU 102 determines whether or not the learning results have almost converged. In a case where it is determined that the learning results have not converged, the CPU 102 returns the procedure to step S502 so as to repeat the processing until evaluation converges to a certain degree due to learning in step S502. In a case where it is determined that the learning results have converged to a certain degree, the CPU 102 advance the procedure to step S505. The CPU 102 can determine whether or not the learning results have converged to a certain degree, for example, by determining whether or not the evaluation value is lower than a predetermined evaluation value. Determination is performed on whether or not "the learning results have converged to a certain degree", since there is usually a risk of overlearning in a case where a learning result has completely converged, and there is the possibility that no accurate estimation result can be obtained when estimation is made on data other than training data. Note that, in a case where the degree of convergence is too low, a learning model that has not been trained and thus cannot be used is obtained, and thus the predetermined evaluation value may be determined through an experiment or the like in advance such that convergence determination is made to a degree to which overlearning does not occur.

In step S505, the CPU 102 makes a selection (in other words, adopts for estimation) from the learned models output for the respective constraint patterns in step S502. As an example of a selection method, a learned model for which the recall rate is lower than a certain standard is an unreliable learned model, and may be discarded as a learned model that is not to be used. Accordingly, the CPU 102 selects a learning model for which the recall rate is higher than a predetermined threshold value. Alternatively, a configuration may also be adopted in which a learned model that includes an evaluation value that exceeds a standard set by the user is selected, and a learned model that includes an evaluation value that is lower than or equal to the standard is discarded. In addition, in a case where a plurality of learned models that include an evaluation value that is larger than or equal to a certain standard remain, the CPU 102 may use the number of times of computation that is used by the estimating element, as further information for making a determination. For example, the CPU 102 discards a learned model for which the number of times of computation is larger than a predetermined threshold value (selects a learned model for which the number of times of computation is lower than or equal to a predetermined threshold value for the constraints). Furthermore, even in a case where the number of times of computation of a learned model meets the constraints, the CPU 102 selects a model for which the number of times of computation is smaller. With such a configuration, the processing amount of the estimating element decreases, which is advantageous for shortening the processing time and reducing the power that is consumed.

As described above, according to this embodiment, one or more constraints for constraining the configuration of the neural network are designated, the neural network is trained under the designated constraints, and an obtained learned model is adopted for estimation. A configuration may also be adopted in which, in a case where a learned model is adopted, for example, a learned model for which the evaluation value (for evaluating the degree of optimization of the learned model) is lower than a predetermined evaluation value is selected. In addition, a configuration may also be adopted in which a learned model for which the number of times of computation is smaller than that of another learned model is selected. With such a configuration, it is possible to generate a learned model that can shorten the computation time of learning and complete estimation in a predetermined time. Here, the constraints include information for specifying the configuration of a neural network and the maximum number of times of computation for the neural network. In addition, the information for specifying the configuration of a neural network includes at least some of the number of nodes of an input layer of the neural network, the number of nodes of an output layer, the number of layers constituting the neural network (the total number of the input layer, the output layer, and hidden layers), and the number of nodes of each hidden layer, for example. With such a configuration, it is possible to train a neural network based on a configuration constrained to a specific configuration, and configure an estimating element such that the number of times of computation (eventually, a requirement of a computation time) is met. Accordingly, the information processing apparatus according to this embodiment can include an estimating element trained so as to complete computations for the neural network within a predetermined time.

Second Embodiment

Next, a second embodiment will be described. According to this embodiment, some of the operations for processing during learning of a learning model are different from the first embodiment, but the configuration of the PC 100 is the same or substantially the same as the first embodiment. Thus, the same reference numerals are assigned to the same or substantially the same constituent elements as the first embodiment, a description thereof is omitted, and the differences will be mainly described.

Figure 6:
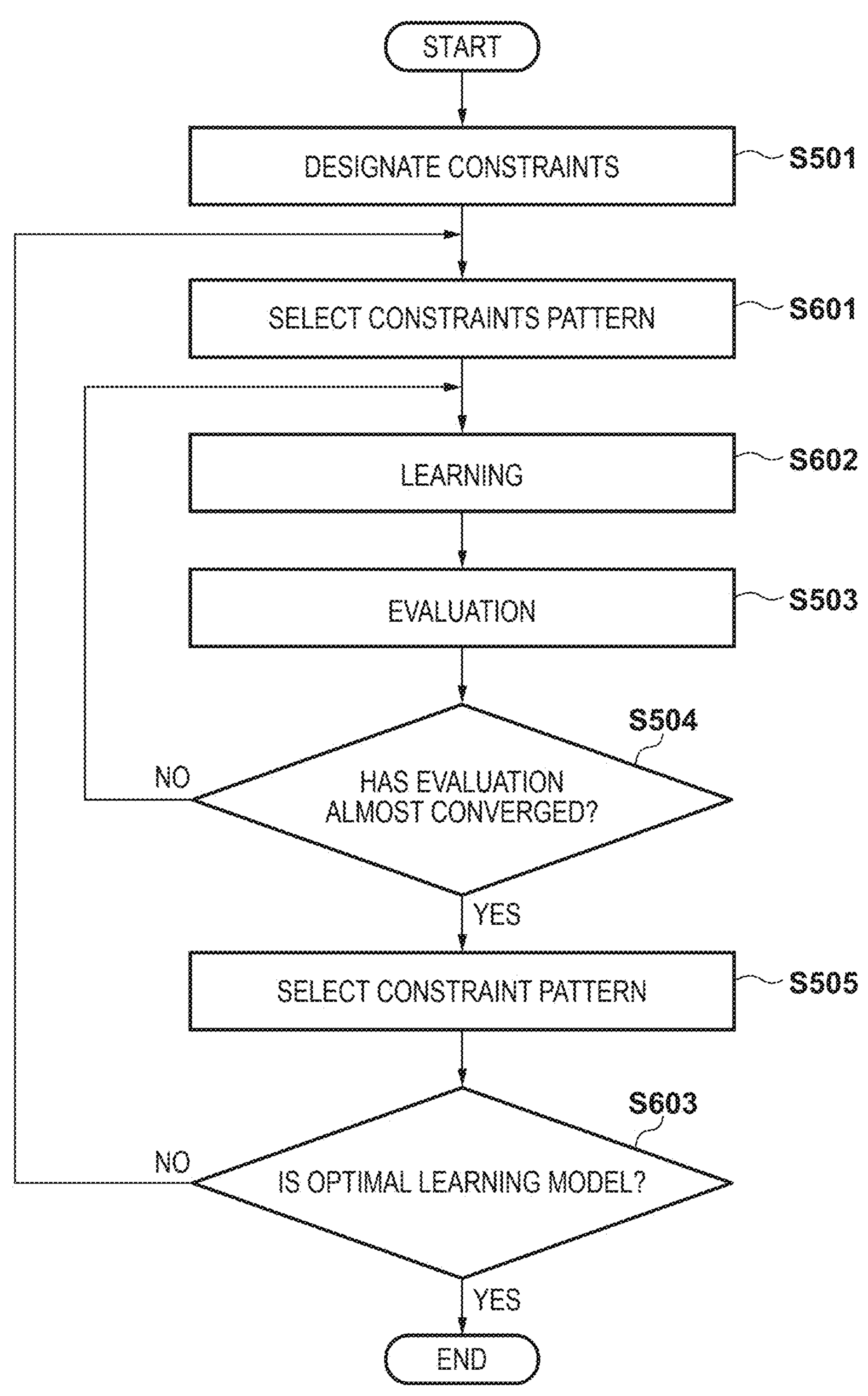
FIG. 6 is a flowchart showing a series of operations during training according to a second embodiment.

A series of operations for processing during learning of a learning model according to this embodiment will be described with reference to FIG. 6. First, similarly to the first embodiment, the CPU 102 designates constraints for performing learning in step S501.

In step S601, the CPU 102 selects one of the designated constraints. For example, the CPU 102 accepts an operating instruction to select one of FIGS. 3B, 3C, 3B, and 3G from the user.

In step S602, the CPU 102 performs learning under the constraint selected in step S601. The learning method may be similar to step S502 described in the first embodiment. Also in step S602, similar to the first embodiment, the learning time may be shortened using GPUs 106. The CPU 102 then executes the processes in steps S503 to S505 similarly to the first embodiment.

In step S603, the CPU 102 determines whether or not to end learning. In the determination, if the learned model selected in step S505 satisfies the evaluation value and the number of times of computation that are constraints designated by the user, a determination may be made that learning does not need to be performed any longer, and all the learning may be ended. In addition, in a case where there is any constraint pattern for which learning has not been performed, learning is performed for the constraint for which learning has not been performed, and a determination is performed on whether or not there is any constraint pattern from which a more preferable result is obtained, and then learning may be ended. In a case where learning is performed for a further constraint for which learning has not been performed, a constraint pattern for which learning has not been performed is selected in step S601 again, and steps S602, S503, S504, S505, and S603 are repeated.

As described above, according to this embodiment, during learning of machine learning, constraints are imposed using predetermined conditions, and thus it is possible to generate a learned model that can shorten the computation time and complete estimation in a predetermined time. In particular, as a result of using a series of operations for learning shown in FIG. 6, all of the constraint patterns do not necessarily need to be executed, and it is possible to shorten the learning time. In other words, also according to this embodiment, the information processing apparatus can include an estimating element trained so as to complete computations for the neural network within a predetermined time.

Note that, in the above embodiment, a method of quantizing weight coefficients based on bit computations has been described as an example. However, the quantization method is not limited thereto, and another method may also be used. A configuration may also be adopted in which weight coefficients are clustered into to a certain number of groups using vector quantization or the like. With such a configuration, it is possible to achieve effects similar to the above embodiment, and also to achieve a more accurate learned model by allocating the weight coefficient value of each cluster to a larger number of bits.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-038120, filed Mar. 5, 2020, which is hereby incorporated by reference herein in its entirety.

What is claimed is:

1. An information processing apparatus comprising:

one or more processors; and a memory storing instructions which, when the instructions are executed by the one or more processors, cause the information processing apparatus to function as:

a designation unit configured to designate one or more constraints for constraining a configuration of a neural network, the constraints including information for specifying a neural network architecture and the maximum number of computations in the neural network, wherein the designation unit is further configured to iteratively compare an actually measured number of product-sum computations (PSC) occurring during training with the maximum number of computations and, when the measured PSC exceeds the maximum, automatically adapt the neural network architecture by reducing at least one of a layer count, a node count or a kernel size and restarting a training cycle until the measured PSC becomes equal to or smaller than the maximum number of computations; and a processing unit configured to execute a computation of a neural network configured based on the designated constraints, wherein the processing unit is configured to:

i) train a plurality of neural networks under the one or more designated constraints;

ii) during each training cycle, monitor an accumulated count of PSC executed by the neural network and, when the accumulated count exceeds the maximum number of computations, notify the designation unit to trigger the automatic adaptation; and iii) output, for every trained neural network, an evaluation value indicative of a degree of optimization of a corresponding learned model, wherein after completion of training under the one or more designated constraints, the processing unit selects, for estimation, as a predetermined learned model, a learned model satisfying both of (1) the evaluation value being greater than or equal to a preset threshold, and (2) a PSC count that is the smallest among the learned models satisfying (1), wherein the maximum number of computations indicates the number of product-sum computations required when a computation of the neural network is executed, and wherein the one or more processors uses the selected learned model to perform learning and estimation processes.

2. The information processing apparatus according to claim 1, wherein a product-sum computation of the neural network includes a computation of adding inputs to which the same weight coefficient of the neural network is to be applied, to each other in advance, and multiplying the resultant by the weight coefficient.

3. The information processing apparatus according to claim 1, wherein the information for specifying the neural network architecture includes at least some of the number of nodes of an input layer of the neural network, the number of nodes of an output layer of the neural network, the number of layers that constitute the neural network, and the number of nodes of each hidden layer of the neural network.

4. The information processing apparatus according to claim 1, wherein weight coefficient of the neural network includes a quantized weight coefficient.

5. An information processing method comprising:

designating one or more constraints for constraining a configuration of a neural network, the constraints including information for specifying a neural network architecture and the maximum number of computations in the neural network, wherein constraining the configuration includes iteratively comparing an actually measured number of product-sum computations (PSC) occurring during training with the maximum number of computations and, when the measured PSC exceeds the maximum, automatically adapting the neural network architecture by reducing at least one of a layer count, a node count or a kernel size and restarting a training cycle until the measured PSC becomes equal to or smaller than the maximum number of computations; and processing for executing a computation of a neural network configured based on the one or more designated constraints, wherein, the processing comprises;

i) training a plurality of neural networks under the one or more designated constraints;

ii) during each training cycle, monitoring an accumulated count of PSC executed by the neural network and, when the accumulated count exceeds the maximum number of computations, notifying the designation unit to trigger the automatic adaptation; and iii) outputting, for every trained neural network, an evaluation value indicative of a degree of optimization of a corresponding learned model, wherein after completion of training under the one or more designated constraints, selecting, for estimation, as a predetermined learned model, a learned model satisfying both of (1) the evaluation value being greater than or equal to a preset threshold, and (2) a PSC count that is minimal among the learned models satisfying (1), wherein the maximum number of computations indicates the number of product-sum computations required when a computation of the neural network is executed, and wherein the selected learned model is used to perform learning and estimation processes.

6. A non-transitory computer-readable storage medium comprising instructions for performing an information processing method, the information processing method comprising:

designating one or more constraints for constraining a configuration of a neural network, the constraints including information for specifying a neural network architecture and the maximum number of computations in the neural network, wherein constraining the configuration includes iteratively comparing an actually measured number of product-sum computations (PSC) occurring during training with the maximum number of computations and, when the measured PSC exceeds the maximum, automatically adapting the neural network architecture by reducing at least one of a layer count, a node count or a kernel size and restarting a training cycle until the measured PSC becomes equal to or smaller than the maximum number of computations; and processing for executing a computation of a neural network configured based on the one or more designated constraints, wherein, processing comprises:

i) training a plurality of neural networks under the one or more designated constraints;

ii) ii) during each training cycle, monitoring an accumulated count of PSC executed by the neural network and, when the accumulated count exceeds the maximum number of computations, notifying the designation unit to trigger the automatic adaptation; and iii) outputting, for every trained neural network, an evaluation value indicative of a degree of optimization of a corresponding learned model, wherein after completion of training under the one or more designated constraints, selecting, for estimation, as a predetermined learned model, a learned model satisfying both of (1) the evaluation value being greater than or equal to a preset threshold, and (2) a PSC count that is minimal among the learned models satisfying (1), wherein the maximum number of computations indicates the number of product-sum computations required when a computation of the neural network is executed, and wherein the selected learned model is used to perform learning and estimation processes.

7. The information processing apparatus according to claim 1, wherein the number of the product-sum computations is obtained in accordance with a predetermined rule according to which inputs sharing a same weight coefficient are added together and then multiplied by the weight coefficient in advance.

8. The information processing apparatus according to claim 1, wherein the one or more processors performs the learning and estimation processes through machine learning using an estimating element constituted by the neural network.

9. The information processing apparatus according to claim 1, wherein the processing unit is configured to train the respective neural networks by repeatedly performing a computation in accordance with a predetermined number of epochs.

10. The information processing apparatus according to claim 1, wherein the evaluation value output by the processing unit is one of a correct-answer ratio, precision, recall, F-score and a numerical value based on an evaluation target.

11. The information processing apparatus according to claim 1, wherein the processing unit is configured to evaluate each learned model trained under the one or more designated constraints based on learning results of the respective learned model.

12. The information processing apparatus according to claim 1, wherein the processing unit is configured to evaluate each learned model trained under one or more designated constraints based on one of a learning curve, a validation curve and accuracy, to output the evaluation value for each learned model.

13. The information processing apparatus according to claim 1, wherein the selected learned model performs estimation processes within a predetermined time.

* * * * *